United States Patent [19]

Hsu et al.

[11] Patent Number: 5,016,947
[45] Date of Patent: * May 21, 1991

[54] CABLE CARRYING METHOD AND APPARATUS FOR MODULAR COMPUTER CABINETS AND THE LIKE

[75] Inventors: Sawyer C. Y. Hsu; Carlo V. Daleo, both of San Diego; Sidney L. Valentine, Poway; James Fratis, San Diego; Robert W. Fischer, Jr., Lakeside, all of Calif.

[73] Assignee: NCR Corporation, Dayton, Ohio

[*] Notice: The portion of the term of this patent subsequent to Sep. 18, 2007 has been disclaimed.

[21] Appl. No.: 514,796

[22] Filed: Apr. 26, 1990

Related U.S. Application Data

[63] Continuation of Ser. No. 370,944, Jun. 23, 1989, Pat. No. 4,597,333.

[51] Int. Cl.5 ............................................. A47B 87/00
[52] U.S. Cl. .................................... 312/108; 312/223
[58] Field of Search .............. 312/223, 167, 199, 195, 312/209, 252, 108, 320; 361/48, 393, 396, 380, 394, 395, 428; 108/50

[56] References Cited

U.S. PATENT DOCUMENTS 4,619,486 10/1986 Hannah et al. ................. 312/196 X
4,957,333 9/1990 Hsu et al. .............................. 312/108

Primary Examiner—Joseph Falk
Attorney, Agent, or Firm—Wilbert Hawk, Jr.; Stephen F. Jewett; Gregory P. Gadson

[57] ABSTRACT

A cable or wire (information bus, power supply, etc.) carrying method and apparatus for modular computer cabinets and the like in which the cabinet frame end walls have notch-like voids. The notches, preferably on the rear side of the cabinets are nearly fully enclosed, save a small opening (to preserve structural integrity) through which the cables may enter. The openings are covered by closure members and decorative trims once the cable is in place. The result is a modular computer system without unsightly wires, and in which the modules may be easily and quickly inserted or removed without the need for dismantling the cable attached to the backs of the other modules.

6 Claims, 3 Drawing Sheets

CABLE CARRYING METHOD AND APPARATUS FOR MODULAR COMPUTER CABINETS AND THE LIKE

This is a continuation of application Ser. No. 370,944, filed June 23, 1989, now U.S. Pat. No. 4,597,333.

BACKGROUND OF THE INVENTION

The present invention generally relates to cable and wire carrying. More particularly, the present invention relates to cable and wire carrying for modular computer systems and the like.

A modular computer system is one in which more than one cabinet contains the elements of the system. Numerous interconnect cables and wires representing information and power supply buses electrically connect the cabinets (or modules). The sheer size and number of the interconnect cables often lead to protrusions which are unsightly and pose safety problems to passers-by.

One prior art solution to the above problems is to locate the computer system on top of a raised floor area so that the interconnect cables do not rest upon or extend into commonly used walkways. While this may eliminate the safety hazard for passers-by, it often does not improve the appearance of the system (the numerous unsightly cables still protrude from the cabinets and are in view). Additionally, the cables in prior computer systems frequently become tangled.

SUMMARY OF THE INVENTION

It is an object of the present invention to provide a cable carrying method and apparatus for computer cabinets and the like which obviates the need for raised floors.

It is also an object of the present invention provide a cable carrying method and apparatus for computer cabinets and the like in which interconnect cables are invisible to the user.

It is another object of the present invention to implement such a method and apparatus in a modular computer system.

It is yet another object of the present invention to easily remove a module from the center of a cluster without having to remove interconnect cables from other modules.

A further object of the present invention is to reduce the tangling of interconnect cables.

There is provided in accordance with the present invention, a computer cabinet which includes, at least an end wall having a hollow with an opening for receiving interconnect cables, and a closure member for closing the opening to prevent cable ingress or egress through the opening.

The above computer cabinet is also a module, which when connectedly arranged with other modules, forms a modular computer system having its interconnect cables efficiently concealed.

The above and other objects, features, and advantages of the present invention will become apparent from the following description with reference to the attached drawings.

DETAILED DESCRIPTION OF THE INVENTION

Figure 1:
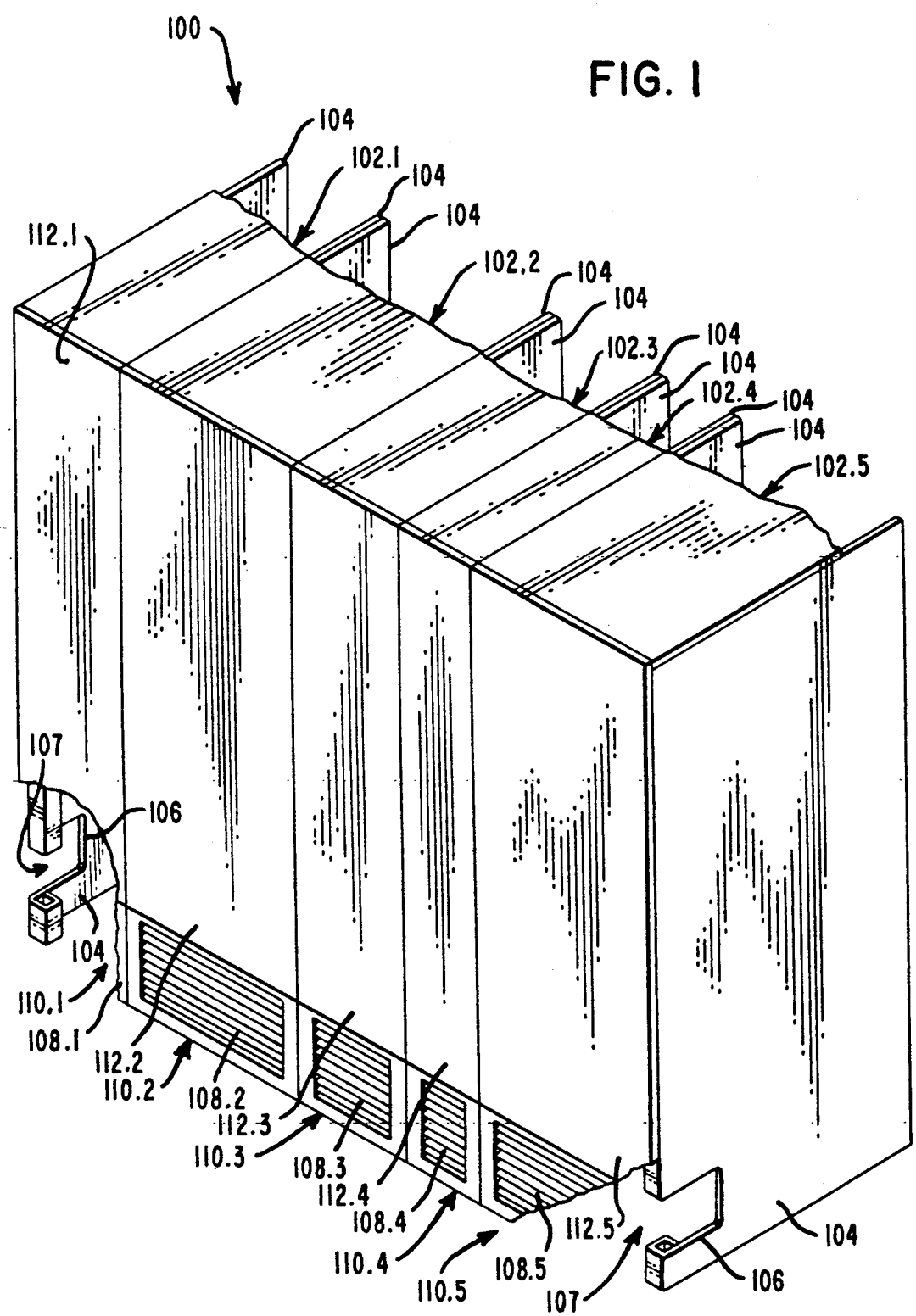
FIG. 1 is a rear perspective view of a modular computer system which employs the cable carrying scheme of the present invention.

Referring now to FIG. 1, a modular computer system 100 is shown. A number of computer cabinets or modules 102.1–102.5 are physically attached, and have electrical interconnect cables (not shown in FIG. 1) spanning the collective width of the system 100. Each module of the modules 102.1–102.5 has two frame end walls 104 made of metal in the preferred embodiment. Each frame end wall 104 has a notch or hollow 106 which serves to substantially define a cable carrying apparatus 107 which extends across the bottom rear of the modules 102.1–102.5, and which will be discussed in more detail infra. Finally, cable retaining grills or covers 108.1–108.5. decoratively cover module openings 110.1–110.5 in rear walls 112.1–112.5 to the modules 102.1–102.5. The openings 110.1–110.5 extend between the notches or cutouts 106. Thus it is shown that the cables become concealed or nearly invisible when placed in the notches and covered (or cloaked) by the retaining grills 108.1–108.5.

Figure 2:
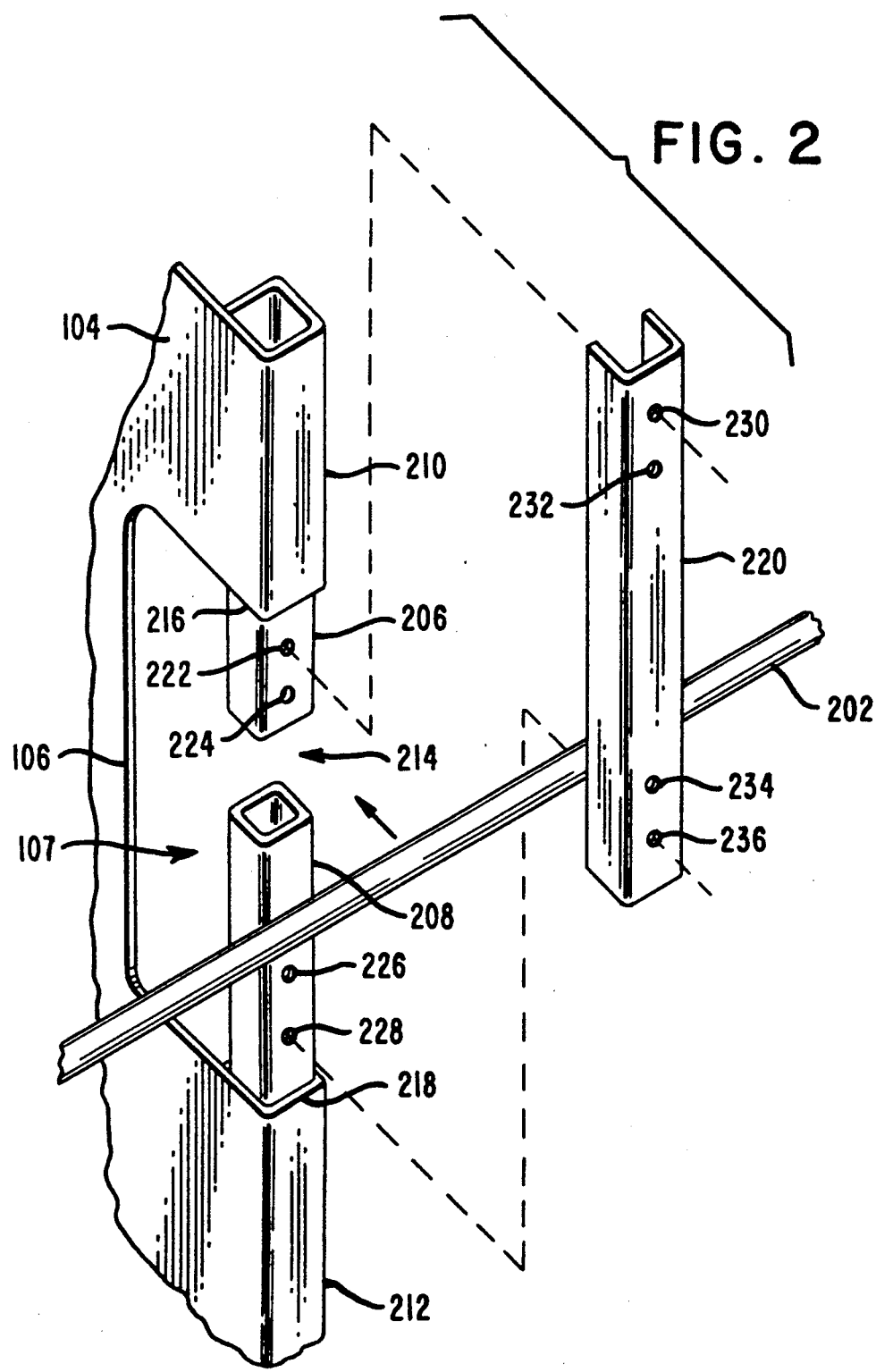
FIG. 2 is an enlarged perspective view of the cable carrying apparatus of the present invention prior to insertion of any cables.

Turning to FIG. 2, a cut-away view of one frame end wall 104 and of the cable carrying apparatus 107 is shown. An interconnect cable 202 is readied for insertion into the cable carrying apparatus 107. The cable rests on the wall 104 at the notch 106. The dimensions of the notch 106 in the preferred embodiment are approximately 10 inches high by 4 inches deep.

Two structural members or columns 206 and 208 protrude from rolled framing or sleeves 210 and 212, which framing 210 and 212 are fixedly wrapped around the columns 206 and 208 all along the frame end wall height, save the cutout area. The columns 206 and 208 provide structural integrity for the frame end walls 104. The absence of the columns 206 and 208 defines an opening or aperture 214 through which the cable 202 may be inserted in the general direction of the arrow shown.

The sleeves 210 and 212 form ledges 216 and 218 which serve as stops for a column joiner or closure member 220, which column joiner 220 is high strength metal used to cover the aperture 214 and at the same time fixedly connect the columns 206 and 208. When properly fitted between the ledges 216 and 218, column holes 222, 224, 226 and 228 are aligned with column joiner holes 230, 232, 234 and 236, respectively. Screws or other attachment means can then be placed in the aligned holes to secure the column joiner 220 to the columns 206 and 208.

Figure 3:
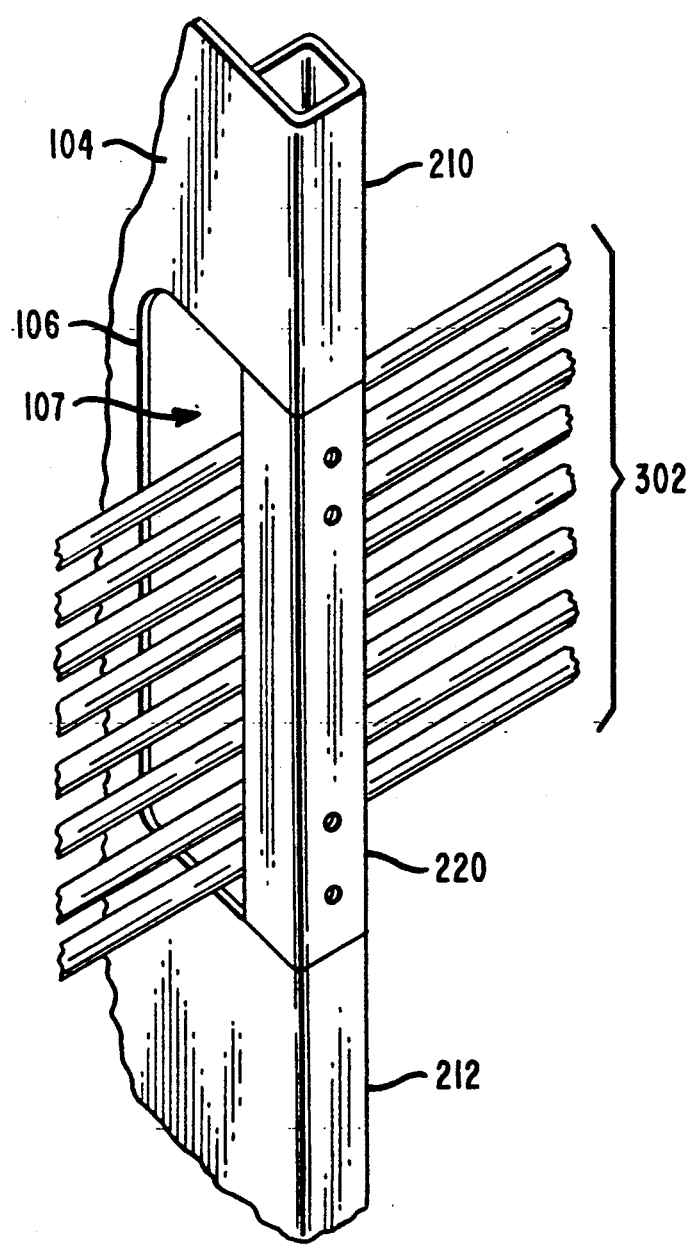
FIG. 3 is an enlarged perspective view of the cable carrying apparatus of the present invention with several cables inserted.

FIG. 3 illustrates the cable carrying apparatus 107 as assembled with several cables 302 in place. Removal of one of the modules 102.1–102.5 in the center of a cluster 100 (see FIG. 1) and hence the cables 302 is easy—simply remove the corresponding retaining grill (108.1–108.5) of the module to be removed, detach the column joiners 220, and pull the cables out of the notches 106 through the openings 214.

Variations and modifications to the present invention are possible given the above disclosure. However, variations and modifications which are obvious to those skilled in the art are intended to be within the scope of this letters patent. For example, the cable carrying apparatuses need not be located at the bottoms of the modules as shown, but can be located anywhere along the frame end wall edges.

We claim:

1. A cabinet housing electronic circuitry comprising:

a plurality of end walls, at least one of which has a notch at a first edge of said end wall, said notch for receiving interconnect cables which span through planes projected by said end walls;

a closure member corresponding to each said notch for closing said notch to prevent cable ingress or egress through said notches, but not preventing the extension of interconnect cables through said notch and through the projected planes of said end walls; and structural members spanningly coupled to said first edges, but not completely covering said notch;

wherein said closure members are removably coupled to said structural members, and a portion of each said end wall wraps around one of said structural members.

2. The cabinet in claim 1 further comprising a cover removably coupled between said end walls to cloak interconnect cables between said end walls.

3. A modular cabinet cluster comprising a plurality of cabinets, each said cabinet housing electronic circuitry and comprising:

a plurality of end walls, at least one of which has a notch at a first edge of said end wall, said notch for receiving interconnect cables which span through planes projected by said end walls;

a closure member removably coupled to each said notch for closing said notch to prevent cable ingress and egress through said notch, but not preventing the extension of interconnect cables through said notch and through the projected planes of said end walls;

the electronic circuitry of each said cabinet, operatively coupled by at least one interconnect cable to the electronic circuitry of at least one other cabinet via a duct formed by positioning said cabinets so that the notch of one cabinet is adjacent to the notch of another cabinet; and structural members spanningly coupled to said first edges, but not completely covering said notch;

said closure members removably coupled to said structural members.

4. The modular cabinet cluster in claim 3 wherein a portion of each said end wall wraps around one of said structural members.

5. The modular cabinet cluster in claim 3 wherein each said cabinet further comprises a cover removably coupled between the end walls of that cabinet to cloak interconnect cables between said end walls.

6. The modular cabinet cluster in claim 4 wherein each said cabinet further comprises a cover removably coupled between the end walls of that cabinet to cloak interconnect cables between said end walls.

* * * * *